Patented Nov. 1, 1927.

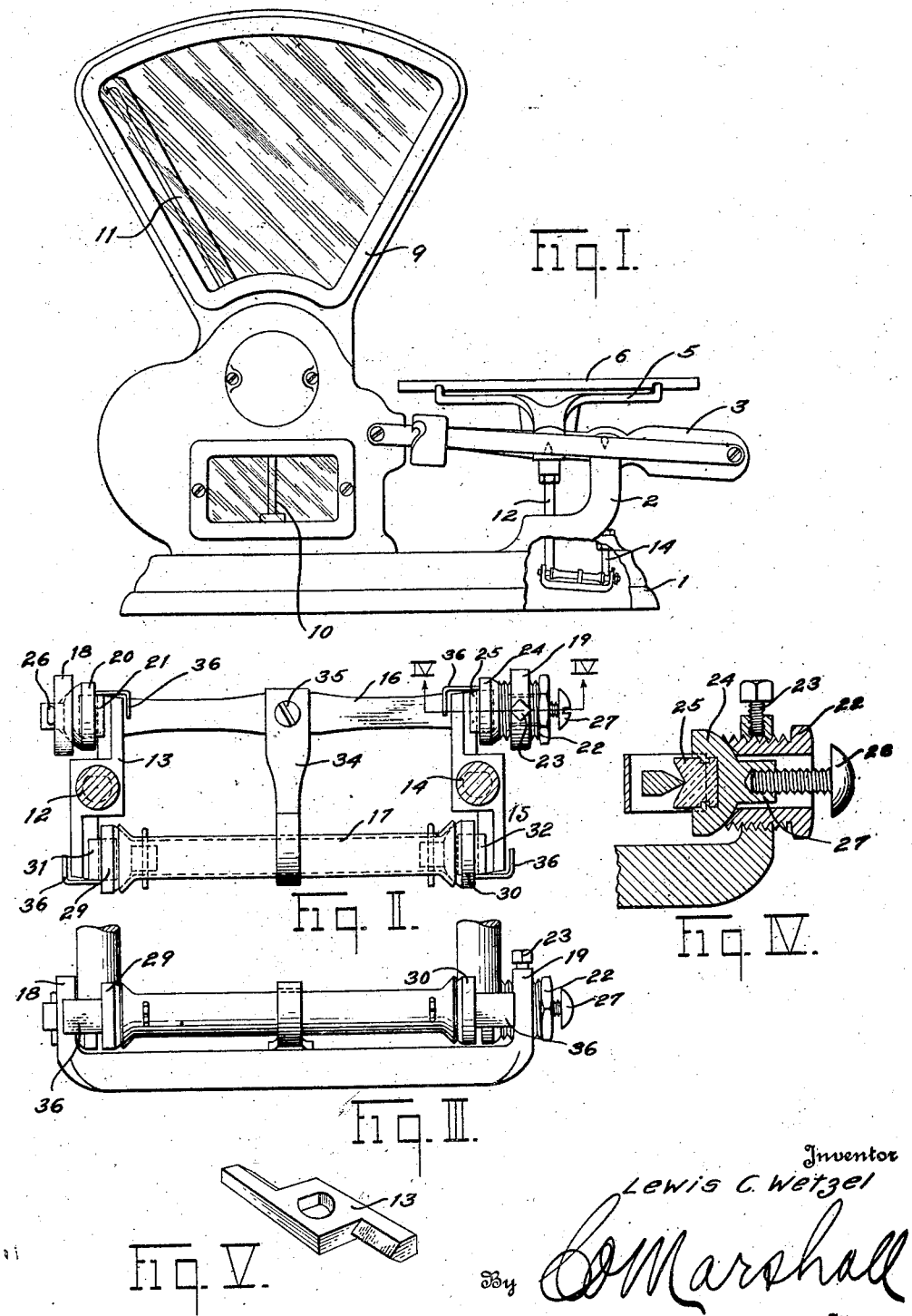

1,647,327

UNITED STATES PATENT OFFICE.

LEWIS C. WETZEL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed January 27, 1926. Serial No. 84,009.

This invention relates to weighing scales, and one of its principal objects is to improve the means employed for stabilizing pivotally mounted members, such as the means for preventing the platform from tipping or tilting when a load is placed adjacent one of its edges.

Another object of this invention is the provision of a stabilizing means for a scale platform of the type forming a "push and pull" connection between the moving parts, the check link being provided with adjustable elements adapted to engage knife edges.

Another object is the provision of a platform stabilizing mechanism for scales having adjustably mounted bearings adapted for engagement with knife edges, the bearings being so constructed as to automatically adjust themselves to perfect aligning engagement with the knife edges.

Still another object is the provision of a check link incorporating jeweled bearings of extremely hard material, such as agate or other material not readily susceptible to the deleterious effects of moisture and corrosion.

Other objects and advantages will be apparent from the following description, in which reference is had to the accompanying drawings illustrating one embodiment of my invention and wherein similar reference numerals designate similar parts throughout the several views.

In the drawings:—

Figure I is an elevational view of a weighing scale of the counter type embodying my invention;

Figure II is an enlarged top plan view of the platform stabilizing mechanism per se;

Figure III is an elevational view of the parts illustrated in Figure II;

Fig. IV is an enlarged fragmentary detail sectional view taken substantially on the line IV—IV of Figure II; and Figure V is a perspective view of one of the knife edge members forming a part of my invention.

Referring to the drawings in detail, I have illustrated my invention as incorporated in a counter scale of the fan type, but it is to be understood that I contemplate the use of my invention wherever it may be found applicable, the scale per se forming no part of the present invention. The scale comprises a substantially hollow base 1, one end thereof being provided with an integral upwardly projecting fulcrum stand 2 which supports the main lever 3 of the scale. The lever 3 is also provided with load pivots which support a spider 5, the latter surmounted by a platform or commodity-receiver 6.

The nose end of the lever projects into a housing 9 erected upon the other end of the base and is operatively connected to some form of load counterbalancing mechanism comprising a pendulum 10 pivotally supported within the housing 9, the pendulum being provided with an upwardly extending indicator hand 11 adapted to co-operate with a chart located in the fan-shaped upper portion of the housing to indicate weights of loads placed upon the platform 6.

The improved platform stabilizing mechanism forming the principal object of this invention will now be described. The platform supporting spider 5 is provided with a depending stem 12, the lower end thereof having a reduced portion preferably non-circular in cross section to which is secured a double knife edge member 13, the knife edges being opposed and longitudinally aligned, as shown in Figure V. Adjustably secured to the base 1 is a rod 14 also provided with a knife edge member 15 substantially the same as the member 13. The check link or stabilizing means connecting the knife edges of these members comprises a pair of substantially parallel members or bars 16 and 17, the member 16 having upwardly turned end portions 18 and 19, the end 18 having a cone-shaped bore therethrough which forms a socket or seat for the spherical portion of a bearing retaining member 20 within which is embedded a jeweled bearing piece 21 formed of agate or other suitable hard material. The other end 19 of the bar 16 is provided with a threaded bore having a threaded bushing 22 retained therein by means of a set screw 23. The bushing is provided with a bore therethrough, the inner extremity of the bushing being cone-shaped to form a seat for a bearing retaining member 24 carrying a bearing agate 25, of substantially the same construction as the bearing 20. The bearing retainer 20 is loosely held in its seat by means of a pin 26 and the bearing retainer 24 is held in its socket by means of a screw 28 threaded into the tenon 27 of the bearing retainer. The bearings 21 and 25 engage certain knife edges of the members 13 and 15 to form an efficient tension or "pull" connection.

The ends of the tubular member 17 are flared to form seats for bearing retaining members 29 and 30 carrying the agate bearings 31 and 32, of the same form and size as the bearings hereinbefore described. The bearings 31 and 32 engage other knife edges on the members 13 and 15 and form therewith a "push" connection. The members 16 and 17 are held in proper relation to each other by means of a connecting bar 34 fixedly secured at one end to the member 16 by means of a screw 35, the other end of the bar being bent so as to form a loop surrounding the tubular member 17 and of slightly greater diametral dimension than that of the member 17 so as to permit slight relative movement of said members. Thrust members 36 are also embedded in the bearing retaining members 20 and 24 adjacent the bearing pieces to limit the relative lateral movement of the connecting members 16 and 17.

The agate bearing pieces are provided with V-shaped grooves which engage the knife edges, the apex line of which passes through the center of curvature and therefore lies along a diameter of the spherical portions of the bearing retaining members. It will be understood that when each of the bearing retaining members is seated in its cone-shaped socket the apex line of the groove may turn about its center in any direction, but the center of the line must always remain in the same position and the bearing cannot, therefore, shift bodily. It will be obvious that with this construction the bearings may automatically align themselves with their respective knife edges so that a full line engagement may be had between each bearing and knife edge. This construction insures a decreased bearing pressure per unit of length of the knife edges, with a consequent increase in the life of the mechanism and less chance for errors in the scale when a load is placed adjacent one edge of the load receiving platform.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including a load receiving platform, a member connected to said platform, a check link member, one of said members having a socket and a bearing resting in said socket, said bearing adapted for engagement with a pivot carried by the other of said members to form a pivotal joint therebetween.

2. In a device of the class described, in combination, weighing mechanism having relatively movable elements, means pivotally connecting said elements, one of said elements having a socket, said means comprising a bearing piece having a portion of its surface of spherical form and resting in said socket, said bearing piece engaging a pivot carried by the other of said members to form a pivotal joint.

3. In a device of the class described, in combination, weighing mechanism including a load receiving platform, a member connected to said platform, a check link member pivotally connected to said platform member, a socket in one of said members, a bearing piece having a portion of its surface spherical in form resting in said socket, means for retaining said bearing in the socket, and a pivot carried by the other of said members engaging said bearing piece to form a pivotal joint.

4. In a device of the class described, in combination, weighing mechanism including a load receiving platform, a member connected to said platform, a check link member, one of said members having a socket, means connecting said members comprising a bearing piece having a portion of its surface spherical in form and resting in said socket, said bearing piece having a V-shaped groove therein, and means including a knife edge carried by the other of said members and engaging the groove in said bearing to form a pivotal joint.

5. In a device of the class described, in combination, weighing mechanism including a load receiving platform, a member connected to said platform, and a check link member pivotally connected to said platform member, said pivotal means comprising a jeweled bearing carried by one of said members, said bearing engaging a pivot carried by the other member to form a connection therebetween.

6. In a device of the class described, in combination, weighing mechanism including a load receiving platform, stabilizing means for said platform comprising relatively movable members, a jeweled bearing carried by one of said members, said bearing engaging a pivot carried by another of said members to form a pivotal connection therebetween.

7. In a device of the class described, in combination, weighing mechanism including a load receiving platform, stabilizing means for said platform comprising relatively movable members, and a jeweled bearing having a V-shaped groove carried by one of said members, said bearing engaging a knife edge pivot carried by another of said members to form a pivotal connection therebetween.

8. In a device of the class described, in combination, weighing mechanism, a load receiving platform connected to said weighing mechanism and having an extension, stabilizing means for said platform comprising a link, a jeweled bearing carried by said link and having a V-shaped groove therein, and a knife edge member carried by said platform extension, said bearing and knife edge co-operating to form a pivotal joint between the link and platform extension.

9. A pivotal connection comprising a pair of relatively movable members, pivots carried by said members, connecting means for said movable members comprising a pair of links, and jeweled bearing pieces carried by said links, said bearing pieces engaging said knife edges to form a "push and pull" connection.

10. A pivotal connection comprising a pair of relatively movable members, knife edges on said members, a pair of links, and jeweled bearing pieces secured to said links and being relatively movable with respect thereto, said bearing pieces adapted to engage and properly align themselves with said knife edges to form a "push and pull" connection between said relatively movable members.

11. A pivotal connection comprising a pair of relatively movable members, knife edges on said members, a connecting link having a plurality of sockets, and bearings resting in said sockets, said bearings engaging said knife edges to form a pivotal connection between said relatively movable members.

12. A pivotal connection comprising a pair of relatively movable members, knife edges on said members, a connecting link having a plurality of sockets, and jeweled bearings resting in said sockets, said bearings engaging the knife edges to form a pivotal connection between said relatively movable members.

13. A pivotal connection comprising a pair of relatively movable members, knife edges on said members, a connecting link having a plurality of sockets, and jeweled bearings resting in said sockets, said bearings engaging the knife edges to form a pivotal connection between said relatively movable members.

14. A pivotal connection comprising a pair of relatively movable members, oppositely disposed longitudinally aligned knife edges on said members, a pair of connecting links each having a plurality of sockets, and bearings resting in said sockets, said bearings engaging said knife edges to form a "push and pull" connection.

LEWIS C. WETZEL.